United States Patent [19]
Cecchini et al.

[11] Patent Number: 5,959,628
[45] Date of Patent: *Sep. 28, 1999

[54] METHOD FOR PROVIDING MAXIMUM SCREEN REAL ESTATE IN COMPUTER CONTROLLED DISPLAY SYSTEMS

[75] Inventors: Albert B. P. Cecchini; Matthew Woodard, both of Jamestown, N.Y.

[73] Assignee: Libera, Inc., Jamestown, N.Y.

[*] Notice: This patent is subject to a terminal disclaimer.

[21] Appl. No.: 08/267,868

[22] Filed: Jun. 28, 1994

[51] Int. Cl.⁶ .................................................. G06F 3/00
[52] U.S. Cl. ............................................ 345/347; 345/341
[58] Field of Search ..................................... 395/155, 161, 395/156, 157, 159, 333, 334, 341, 342, 347, 973; 345/145, 146, 121, 123, 333, 334, 341, 342, 347, 973

[56] References Cited

U.S. PATENT DOCUMENTS

| | | | |
|---|---|---|---|
| 4,896,291 | 1/1990 | Gest et al. | 395/156 |
| 5,230,063 | 7/1993 | Hoeber et al. | 395/156 |
| 5,241,655 | 8/1993 | Mineki et al. | 395/156 |
| 5,243,697 | 9/1993 | Hoeber et al. | 395/156 |
| 5,327,529 | 7/1994 | Fults et al. | 395/155 |
| 5,333,247 | 7/1994 | Gest et al. | 395/155 X |
| 5,345,550 | 9/1994 | Bloomfield | 395/156 |
| 5,363,481 | 11/1994 | Tilt | 395/156 |
| 5,438,659 | 8/1995 | Notess et al. | 395/155 |
| 5,438,662 | 8/1995 | Randall | 395/161 |
| 5,463,725 | 10/1995 | Henckel et al. | 395/155 |
| 5,483,651 | 1/1996 | Adams et al. | 395/159 X |
| 5,500,929 | 3/1996 | Dickinson | 395/160 |
| 5,500,936 | 3/1996 | Allen et al. | 395/156 |
| 5,655,094 | 8/1997 | Cline et al. | 345/341 |

OTHER PUBLICATIONS

Now Software, Inc., "Now Utilities" Manual, pp. 4–1–4–5, 1991.
Visual Tablet™ brochure, ZMC, 1992, pp. 1–4.

*Primary Examiner*—Matthew M. Kim
*Assistant Examiner*—Crescelle N. dela Torre
*Attorney, Agent, or Firm*—Woodcock Washburn Kurtz Mackiewicz & Norris LLP

[57] ABSTRACT

A method for maximizing the amount of screen display real estate without sacrificing the user's ability to pan graphic and other data is disclosed which has application for use in computer controlled display systems. The CPU is capable of accessing and executing a computer program which includes a first event loop handler. The first event loop handler includes events, each which are selectively paired with a different set of screen coordinates, said set of screen coordinates comprising a first hot spot file. A user moves a pointer around on the screen display by using a pointer control device. The position of the pointer is monitored by the first event loop handler. The first event loop handler determines whether the position of the pointer corresponds to a set of screen coordinates in the first hot spot file which, in turn, corresponds to an event, most preferably, the display of a horizontal, vertical or diagonal scrollbar. The CPU executes the first event loop handler thereby causing a horizontal, vertical or diagonal scrollbar, most preferably, to appear on the screen display, but only when the position of the pointer corresponds to a set of screen coordinates in the main event table paired with a pre-selected event, again, most preferably the scrollbar displaying event which launches a panning means such as a horizontal, vertical or diagonal scrollbar. Then and only then is the screen display encumbered by the presence of scrollbars. Accordingly, it is not necessary to press a mouse button to initiate an event.

22 Claims, 6 Drawing Sheets

METHOD FOR PROVIDING MAXIMUM SCREEN REAL ESTATE IN COMPUTER CONTROLLED DISPLAY SYSTEMS

BACKGROUND OF THE INVENTION

1. Field of the Invention

The present invention relates to a method for providing the maximum amount of display screen area or "real estate" without sacrificing a computer user's ability to pan the image, and more particularly, the present invention relates to a computer controlled display system in which scrollbars remain hidden from the user until a pointer is positioned by the user, utilizing a pointer control device, over selected locations (i.e. displaying means such as "hot spots") at which time the scrollbars become visible to the user or "pop-up", thereby allowing the user to pan the image on the screen by utilizing the scrollbars in a conventional manner.

2. Description of the Prior Art

It is common for computer display systems to represent and convey information to a user through various graphic and textual representations of data. Representations of data may take a variety of forms, such as, for example, alphanumeric characters, Cartesian graphs, pictures, as well as shapes of well known physical objects. As is well known in the art, central processing units (CPU's) of computer display systems often display fixed images of vertical and/or horizontal scrollbars which permit text, graphics and the like within the working area of a window to be panned in the direction in which the scroll bar is "dragged" or "clicked". The scrollbars may be activated by placing the pointer over the arrows of the scrollbar and activating a selected switch on a pointer control device or mouse, or alternatively, by placing the pointer on the scrollbar, depressing a preselected switch on the pointer control device, and moving it in the direction in which the text, graphics or the like within the working area is to be panned. However, the vertical and/or horizontal scrollbars displayed on a computer display screen occupy significant portions of the screen's real estate, thereby leaving less screen real estate available for the display of text, graphics and the like.

With the development of software technology aimed at converting text and graphics from the traditional, paper-based form to an electronic form, as stored on CD-ROM, using traditional computer software programs and apparatus, there has been a real, heretofore unmet, need to develop complementary methods which permit the maximization of the screen's real estate without sacrificing the ability to pan the images displayed therein. The need for such methods of maximizing a display screen's real estate is particularly keen among book and magazine publishers, advertising agencies and comic strip publishers, who are increasingly turning to software developers to convert text and graphics from a traditional print medium to an electronic medium. It is critical, however, to the success and viability of those products which have been converted to an electronic medium to be displayed on a computer screen where the size of the image, as well as its visual impact, is not diminished or encumbered by the presence of scrollbars fixedly displayed on the screen.

All of the software environments of the prior art known to the applicant utilize scrollbars that are fixed on a screen and, as such, are a distraction both in terms of visual impact or aesthetics when panning is required. Moreover, they result in a significant reduction in screen real estate that would otherwise be available to more fully display the graphic or other data. The present invention discloses a significant improvement in computer controlled display systems, which results in the maximization of the amount of screen real estate available for displaying graphic or other data without sacrificing the user's ability to pan an image on the display screen.

These known software environments utilize event loop handlers to permit standard operation of the scrollbars fixed on a display screen. An event loop handler is a segment of source code which monitors the position of a pointer on a display, keystrokes, etc. and produces a response (ie. an event) for a corresponding input. The event could be under user control or automated control of the CPU based on predetermined algorithms. The event loop handler incorporates sets of screen coordinate values or key strokes which include an activation table in memory or file form. Paired with each set of screen coordinate values or key presses within an event loop handler is a particular event. Known events include, for example, the activation of a window title bar, window border, action bar, system menu icon, window-sizing icon and scrollbar. When a pointer, in response to movement of a pointer control device, is positioned by a user on the display such that its position corresponds to certain screen coordinates located in the main event loop handler table, the main event loop handler is executed by the CPU, thereby causing the event paired with the set of screen coordinates or key presses, such as the panning of an image through use of a vertical or horizontal scrollbar, to take place. The scrollbar event permits text, graphics and the like within the working area of a window to be panned in the direction in which the scrollbar is pulled. When the position of a pointer, as determined by the main event loop handler or the scrollbar's activation event loop handler, does not correspond to an activation table entry, the event loop handler has not caused the corresponding activation event to take place. It is only when the position of a pointer corresponds to an activation table entry that the CPU executes the scrollbar's event loop handler eliciting the panning functions.

SUMMARY OF THE INVENTION

A method is disclosed which has application for use in computer controlled display systems. A central processing unit (CPU) is provided and is coupled to a monitor for displaying graphic and other data. The CPU is further coupled to a pointer control device which permits a user to selectively position a pointer at a desired location on the display and to signal the CPU of selections in accordance with the teachings of the present invention.

Instead of viewing the manipulation of the scrollbar by the CPU, for example, as the only relevant event, the present invention treats the display of the image of a scrollbar by the CPU as the relevant event. In turn, this separate and heretofore unknown scrollbar displaying event may have its own event loop handler which when executed by the CPU provides for the modification of the scrollbar displaying event properties. By employing this separate event type which keeps scrollbars hidden until the event loop handler activates the scrollbar displaying event thereby activating the scrollbar event, the present invention overcomes the disadvantages attendant to known computer controlled display systems utilizing scrollbars fixed on a computer screen. As such, the present invention provides the advantages of reducing screen clutter, enhancing the visual impact of the graphic or other data, and maximizing utilization of precious screen space, without losing the ability to pan the image.

The presently preferred embodiment of the invention, in effect, hides the scrollbars until the pointer enters a displaying means such as a "hot spot". At that time, the main event loop handler activates the scrollbar displaying event under control of the CPU thereby causing the associated scrollbar event to take place which results in the scrollbar "popping-up" and staying up while the pointer control device is utilized to activate the scrollbar, or the pointer otherwise remains within the area of the displaying or activation means such as "hot spots", or the main event and/or scrollbar activation event loop handler recognizes some event which deactivates it. Once the scrollbar is displayed, the user can position the pointer over the scrollbar activation "hot spots". The scrollbar activation event loop handler is then executed by the CPU thereby causing the activation of panning functions associated with the scrollbar event. When the pointer is no longer over the displaying or activation means such as "hot spots" on the display screen, the CPU's display and use of the vertical, horizontal, and/or diagonal scrollbars, is automatically ended. It will be appreciated by one of ordinary skill in the art, that the term "main event loop handler" is not used strictly as a reference to a specific area of a software or firmware program but as a general reference to any event loop handler of any subroutine with CPU focus, for example, the scrollbar's activation loop handler or modifying event loop handler. Therefore, subroutine calls to or recursion on the instant invention is capable of being executed under this embodiment.

In a second preferred embodiment, a user is able to change certain characteristics of the scrollbar displaying event and/or the scrollbar event before the launch of the scrollbar event. This is accomplished through the incorporation of a modifying event loop handler within the scrollbar displaying event. Specifically, as the pointer enters the scrollbar displaying event, properties associated with the scrollbar displaying event and/or scrollbar event are presented by the CPU and displayed for modification. The scrollbar displaying event properties from which a user could choose include the ability to modify and/or change certain characteristics of itself including the presence of a time delay before the launch of the scrollbar event and the duration of the time delay, activation or deactivation of an icon to indicate the launch of the scrollbar event, the type of icon used as an indicator of the launch, and the type of activator ("hotspot", button, switch, icon, or automated selection under CPU control). The scrollbar event properties from which a user could choose include type (i.e. horizontal scrollbar, vertical scrollbar, diagonal scrollbar, dial, gauge, icon), screen position, size, shape, color, relief (i.e. none, indented, outdented), and visibility status (i.e., visible or invisible). A user chooses a desired property by means well-known in the art such as menu options, dialogue boxes, command line data entry, input field, pick boxes, scroll boxes, or any other means available for entering data. Once the user has selected the desired characteristics of the scrollbar displaying event and/or the scrollbar event, the user saves these selected characteristics to scrollbar displaying event and/or scrollbar event tables, respectively, and continues with the activation of the scrollbar event.

Other details and advantages of the present invention will become apparent as the following description of the presently preferred embodiments and presently preferred methods of practicing the invention proceeds.

DETAILED DESCRIPTION OF THE DRAWINGS

NOTATION AND NOMENCLATURE

Figure 1:
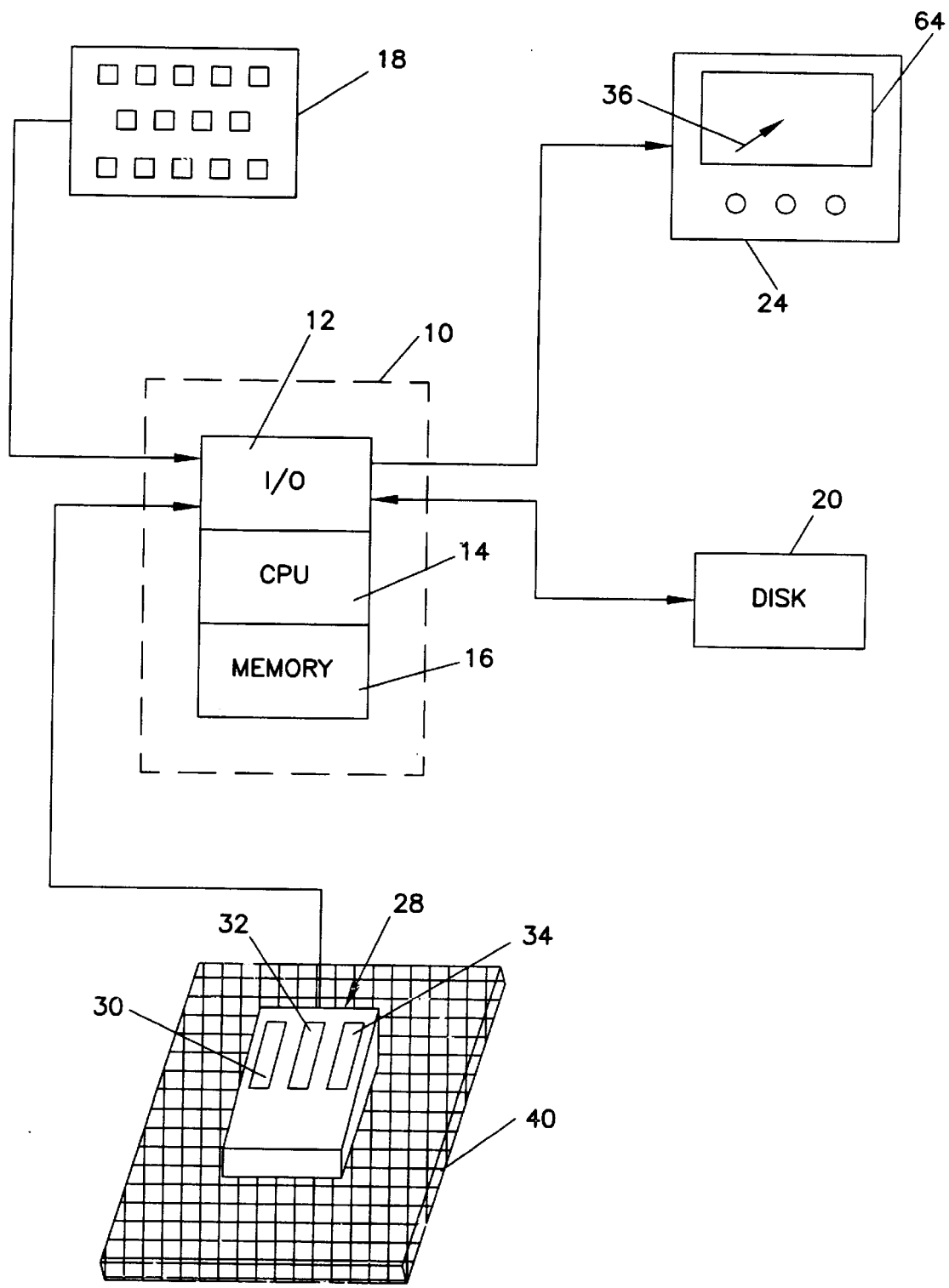
FIG. 1 illustrates a computer incorporating the teachings of the present invention.

The detailed descriptions which follow are presented largely in terms of algorithms and symbolic representations of operations on data bits within a computer memory. These algorithmic descriptions and representations are the means used by those skilled in the data processing arts to most effectively convey the substance of their work to others skilled in the art.

An algorithm is here, and generally, conceived to be a self consistent sequence of steps leading to a desired result. These steps are those requiring physical manipulations of physical quantities. Usually, though not necessarily, these quantities take the form of electrical or binary signals capable of being stored, transferred, combined, compared, and otherwise manipulated. It proves convenient at times, principally for reasons of common usage, to refer to these signals as bits, values, elements, symbols, icons, characters, terms, numbers, or the like. It should be borne in mind, however, that all of these and similar terms are to be associated with the appropriate physical quantities and are merely convenient labels applied to these quantities.

Furthermore, the manipulations performed are often referred to in terms, such as adding or comparing, which are commonly associated with mental operations performed by a human operator. No such capability of a human operator is necessary, or desirable in most cases, in any of the operations described herein, which form part of the present invention; the operations are machine operations, although when dealing with a graphic interface, by its nature, the man/machine interface utilizes some form of human input. Useful machines for performing the operations of the present invention include general purpose digital computers or other similar devices. In all cases it should be borne in mind the distinction between the method of operations and operating a computer and the method of computation itself. The present invention relates to methods for operating a computer and processing electrical or other physical signals to generate other desired results.

The present invention also relates to apparatus for performing these operations. This apparatus may be specially constructed for the required purpose or it may comprise a general purpose computer as selectively activated or reconfigured by a computer program stored in the computer. The images, algorithms, and data structures presented herein are not inherently related to any particular computer or other apparatus. In particular, various general purpose machines may be used with programs written in accordance with the teachings herein, or it may prove more convenient to construct more specialized apparatus to perform the required method steps. In addition, no particular programming language has been indicated for carrying out the various procedures described herein. This is due in part to the fact that not all languages that might be mentioned are universally acceptable for the purpose of the present invention. Each user of a particular computer will be aware of the language which is most suitable for his immediate purposes. In practice it has been proven useful to substantially implement the present invention in C++ source code, C code, Pascal code, or assembly code. Accordingly, no detailed program listings have been provided. It is considered that the operations and other procedures described herein and illustrated in the accompanying drawings are sufficiently disclosed to permit one of ordinary skill to practice the present invention or so much of it as is of use to him/her.

DETAILED DESCRIPTION OF THE INVENTION

The present invention discloses a method for maximizing the amount of screen display real estate available to a user without sacrificing the user's ability to pan images displayed on a computer screen. In the following description, numerous specific details are set forth such as computer display system elements, display formats, sample data, etc. in order to provide a more thorough understanding of the present invention. However, it will be apparent to one skilled in the art that the present invention may be practiced without these specific details. In other instances, well known circuits and structures are not described in detail in order not to obscure the present invention unnecessarily.

FIG. 1 illustrates a computer based system for generating graphic images in accordance with the teachings of the present invention. Shown is a computer 10 which comprises three major components. The first of these is an input/output (I/O) circuit 12 which is used to communicate information in appropriately structured form to and from other portions of the computer 10. In addition, computer 10 includes a central processing unit (CPU) 14 coupled to the I/O circuit 12 and a memory 16. These elements are those typically found in most general purpose computers and, in fact, computer 10 is intended to be representative of a broad category of data processing devices. FIG. 1 also illustrates a keyboard 18 to input data and commands into computer 10, as is well known. A magnetic disk 20 is shown coupled to I/O circuit 12 to provide additional storage capability for the computer 10. It will be appreciated that additional devices may be coupled to computer 10 for storing data such as magnetic tape drives, bubble memory devices, as well as networks which are, in turn, coupled to other data processing systems. As is well know, disk 20 may store other computer programs, characters, routines, etc., which may be accessed and executed by CPU 14. A display monitor 24 is shown coupled to the I/O circuit 12 and is used to display images generated by CPU 14 in accordance with the present invention. Any well known variety of cathode ray tube (CRT) display may be utilized as display 24. A pointer control device 28 is also shown coupled to computer 10 through I/O circuit 12. Pointer control device 28 includes switches 30, 32 and 34 for signalling CPU 14. Pointer control device 28 (an example of which is a "mouse") permits a user to select various command modes, modify graphic data, input other data, and, most importantly for purposes of the present invention, use scrollbars utilizing event switches 30, 32 and 34. More particularly, pointer control device 28 permits a user to selectively position a pointer 36 at any desired location on display 24 by movement of the pointer control device 28 over a surface 40. In the presently preferred embodiment, a well known method for signalling CPU 14 of positional changes of pointer 36 is utilized by having a main event loop handler 5 (FIG.2) monitor the positional changes. However, it will be appreciated that other well known methods, including optical methods, can be utilized to poll the position of pointer 36. It will be appreciated that a variety of well known pointer control devices may be utilized by the present invention including other pointer control devices such as mechanical mice, track balls, joy sticks, etc., which may moved over a grid disposed on surface 40.

Figure 2:
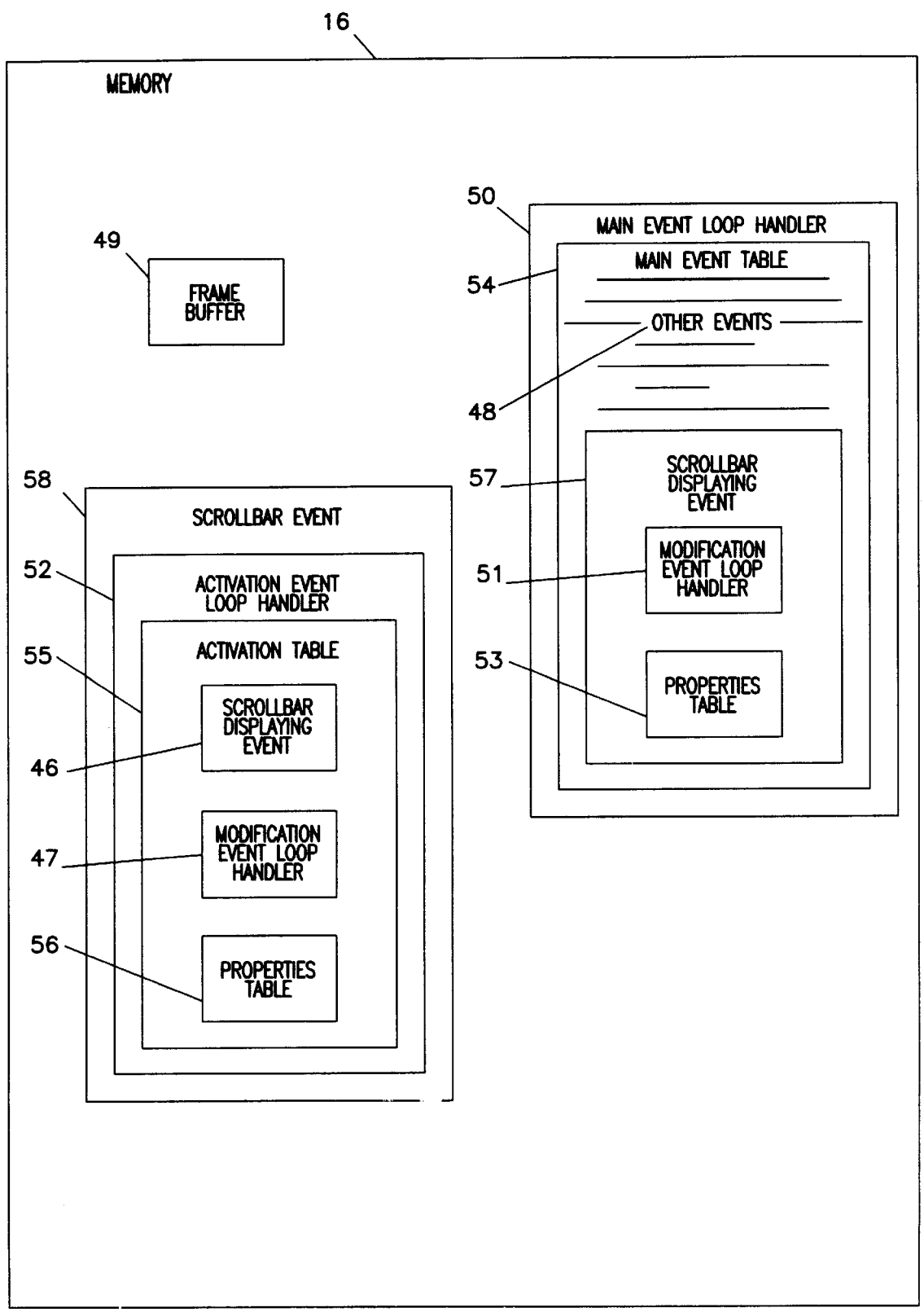
FIG. 2 shows one arrangement of program storage for the system of FIG. 1.

FIG. 2 shows one arrangement of major programs contained within memory 16 illustrated in FIG. 1. In particular, there is shown a frame buffer 49, which comprises a bit map of display 24. The frame buffer 49 represents a video memory for the display 24, wherein each storage location in the frame buffer 49 corresponds to a pixel on the display 24. Thus, the frame buffer 49 comprises a two dimensional array of points having known coordinates corresponding to the pixels on the display. In its simplest form, frame buffer 49 comprises a block of memory which is allocated such that each memory location is mapped onto the corresponding pixel on the display 24. Memory 16 also includes a variety of other programs for execution by the CPU 14. In particular, main event loop handler 50, main event table 54, other events 48 in the main event loop handler's (50) event table 54, main event loop handler's (50) scrollbar displaying event 57, scrollbar displaying event's modification event loop handler 51, scrollbar displaying event's properties table 53, scrollbar event 58, scrollbar's activation event loop handler 52, scrollbar's activation table 55, scrollbar display event 46, scrollbar event's modification event loop handler 47, and scrollbar event's properties table 56, all as more fully described hereinbelow, may be stored in memory 16. Moreover, memory 16 further includes space for other programs requiring memory (16) such as a variety of control, display, and calculating programs which may be used for a variety of other well known functions and operations in data processing systems such as implementing the operations and routines described in this Specification.

As shown in FIG. 1 and the chart of FIG. 2, appropriate programming of computer 10 is provided such that a main event table 54 exists in memory 16 or is referenced from a disk file (not shown). Main event table 54 consists of sets of pre-selected screen coordinates such as (x1, y1)/(x2, y2); (xx1, yy1)/(xx2, yy2), etc. Also existing within memory 16 is main event loop handler 50 which is a well known device or, more accurately, segment of source code which monitors the positional changes of pointer 36, as well as keyboard and/or other events.

Although the presently preferred embodiment of the instant invention employs "hot spots" as a displaying means to activate the heretofore unknown display of a scrollbar event, it should be appreciated by those skilled in the art that the scrollbar event can be activated by a variety of well-known means such as menus, buttons, key sequences, key presses, etc. Accordingly, the properties associated with the aforementioned other means can be similarly modified. For example, if the display of a scrollbar event is "hot spot" activated, then the "hot spot's" size, shape, color, etc. may be modified. Moreover, as will be further appreciated by one skilled in the art, the user can change the properties associated with the instant invention such as the type of means for activating the display of the scrollbar event. In other words, one of the properties of the display of a scrollbar event is whether it is launched by "hot spots", menus, buttons, key sequences, key presses, etc.

Each screen coordinate value or key press in main event table 54 is then paired with a specified event in an event loop such as, for example, the display of, for example, command menus, window borders and, most preferably, scrollbars. Each screen coordinate value or key press and corresponding event are then loaded into main event loop handler 50. As shown in the flow charts of FIGS. 3 and 4, the user practices the present invention by first selecting the graphic or other data to be panned. The user then moves pointer 36 in a desired direction on display 24 using pointer control device 28. The positional changes of pointer 36 are monitored by CPU's main event loop handler 50. Main event loop handler 50 determines whether the position of pointer 36 or a key press corresponds to a given set of screen coordinates or key press in main event table 54. If the positional coordinates of pointer 36 correspond to a given set of screen coordinates, CPU 14 executes main event loop handler 50, thereby causing the event paired with the matched set of screen coordinate or key press values to take place. In the presently preferred embodiment, the event is the launch by CPU 14 of the scrollbar event 58 by the main event loop handler's (50) scrollbar displaying event 57.

Figure 3:
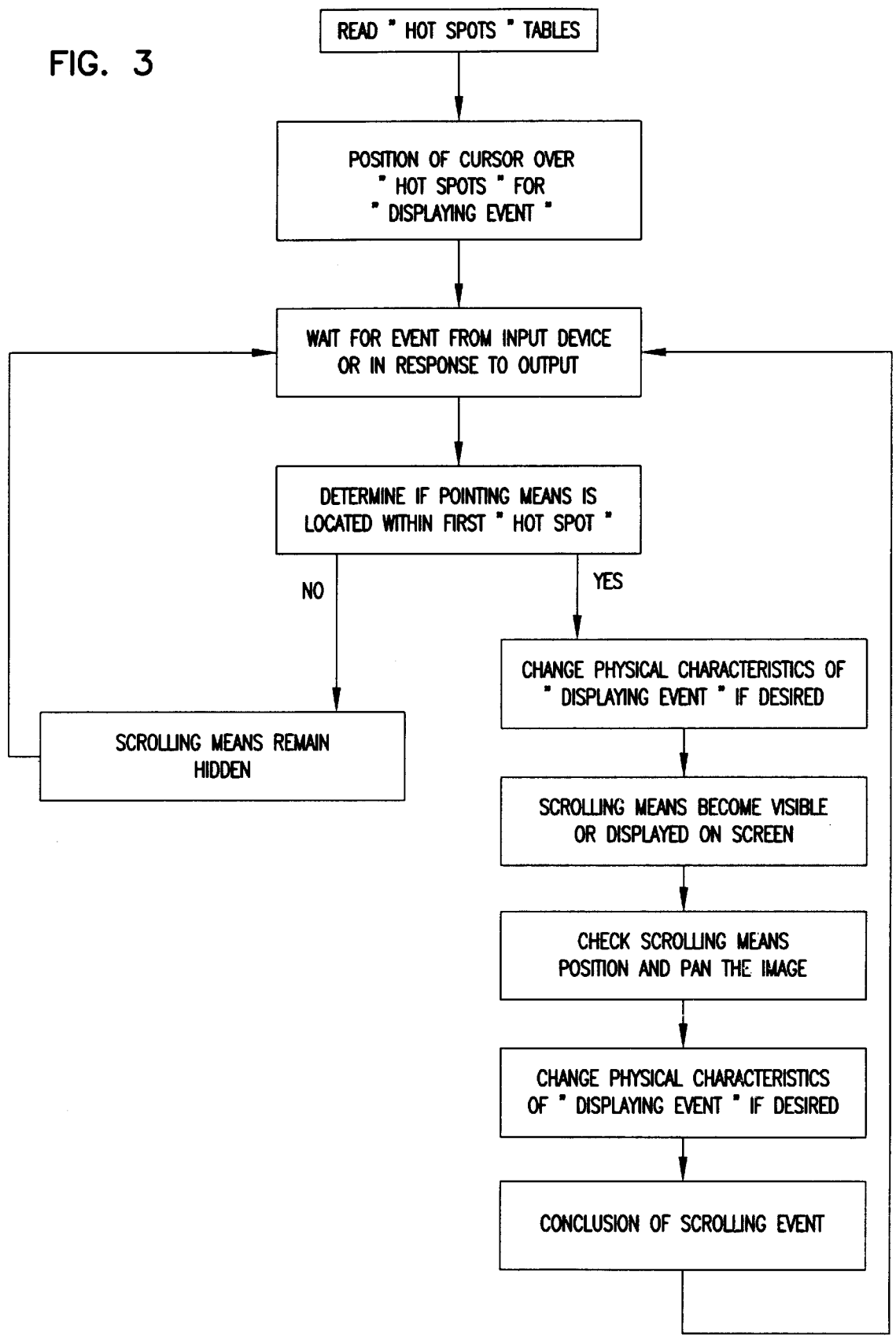
FIG. 3 is a flow chart illustrating the sequence of steps utilized by the present invention in causing the execution of the main event loop handler for purposes of causing, in turn, the scrollbar displaying event which in turn causes the scrollbar event to take place.
Figure 4:
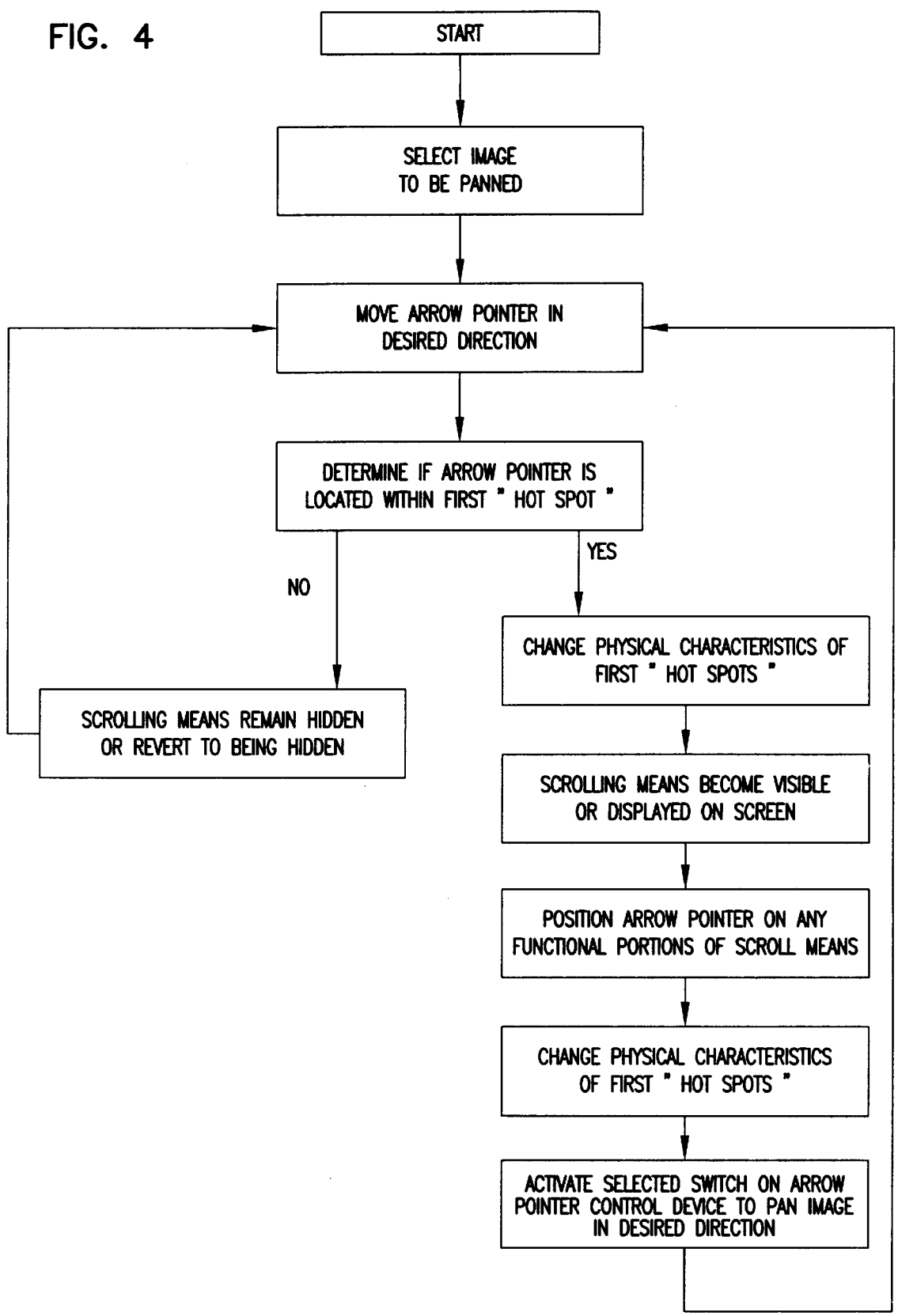
FIG. 4 is a flow chart illustrating the sequence of steps taken by a user in practicing the present invention.

Also as shown in FIG. 2 and the flow chart of FIG. 3, appropriate programming of computer 10 is provided such that a scrollbar's activation table 55 exists in memory 16 is referenced from a disk file (not shown). Scrollbar's activation table 55 consists of pre-selected key presses or screen coordinates such as (a1, b1)/(a2, b2); (aa1, bb1)/(aa2, bb2), etc. which correspond to the functional portion(s) of the image displayed such as a scrollbox 60 of scrollbar 59 (FIG. 5), for example. Also existing with memory 16 is a scrollbar's activation event loop handler 52 which, similar to main event loop handler 50, is a separate segment of source code which monitors the positional changes of pointer 36, as well as keyboard events, once the scrollbar event 58 has been launched and, in particular, when vertical scrollbar 59, for example, is displayed on screen 24.

Figure 5:
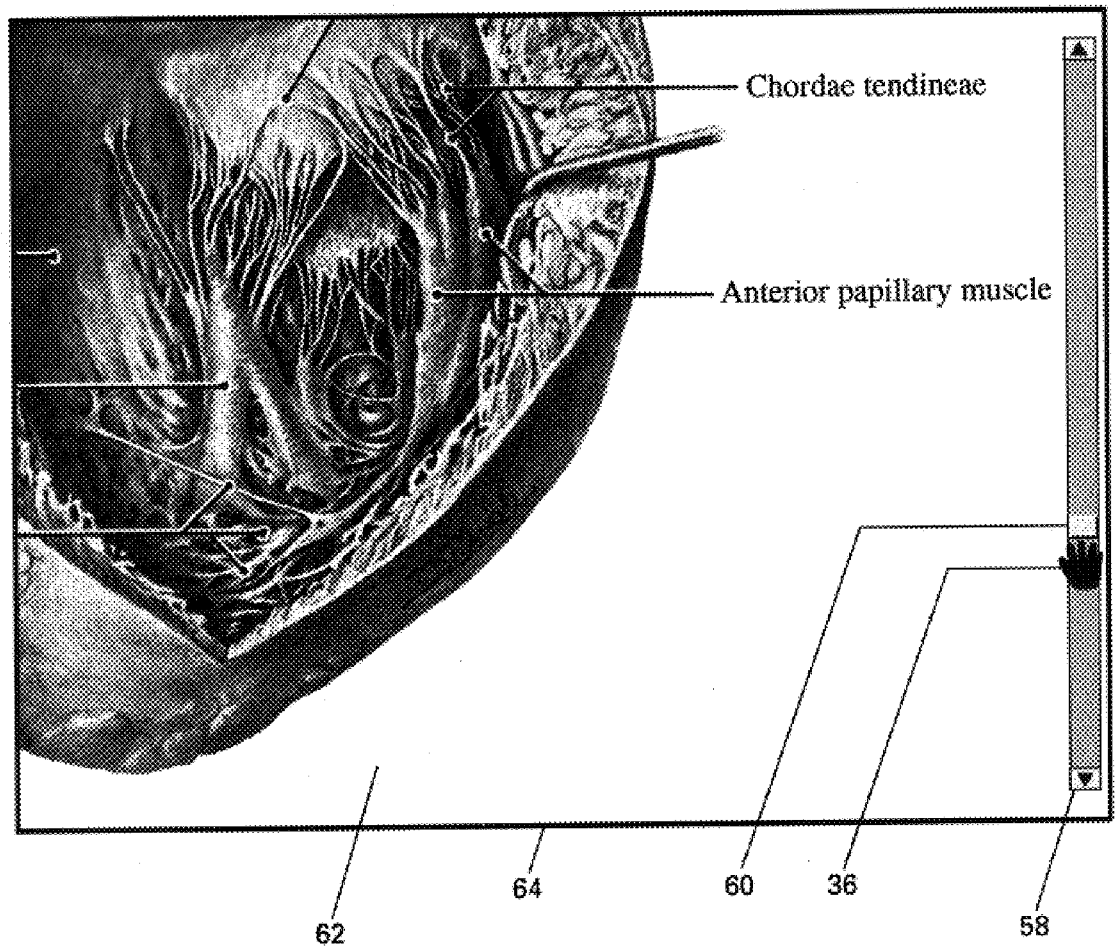
FIG. 5 is a screen display depicting a graphic image of the presently preferred embodiment as well as an image of a vertical scrollbar made visible as a result of the cursor, as shown therein, being positioned over the displaying "hot spot."

Each screen coordinate or key press value in the scrollbar's activation table 55 is paired with a specified event in an activation event loop handler 52 such as, for example, the activation or controlling of panning of the image on the display 24. If the positional coordinates of pointer 36 correspond to a given set of screen coordinates or key presses, as shown in FIG. 5, CPU 14 either automatically or under user direction executes the scrollbar's activation event loop handler 52, thereby causing the activation event paired with the matched set of screen coordinate values to take place. In the presently preferred embodiment, the event is the activation of the panning means which allows panning of text, graphics, etc., such as image 62 within window 64, associated with the functional areas of vertical, horizontal and/or diagonal scrollbars, dials, gauges by CPU 14. This does not preclude the use of the scrollbar's activation event loop handler 52 for the inclusion of other events such as modification events 47 or, more particularly, additional scrollbar displaying events 46 of scrollbar event 58.

Figure 6:
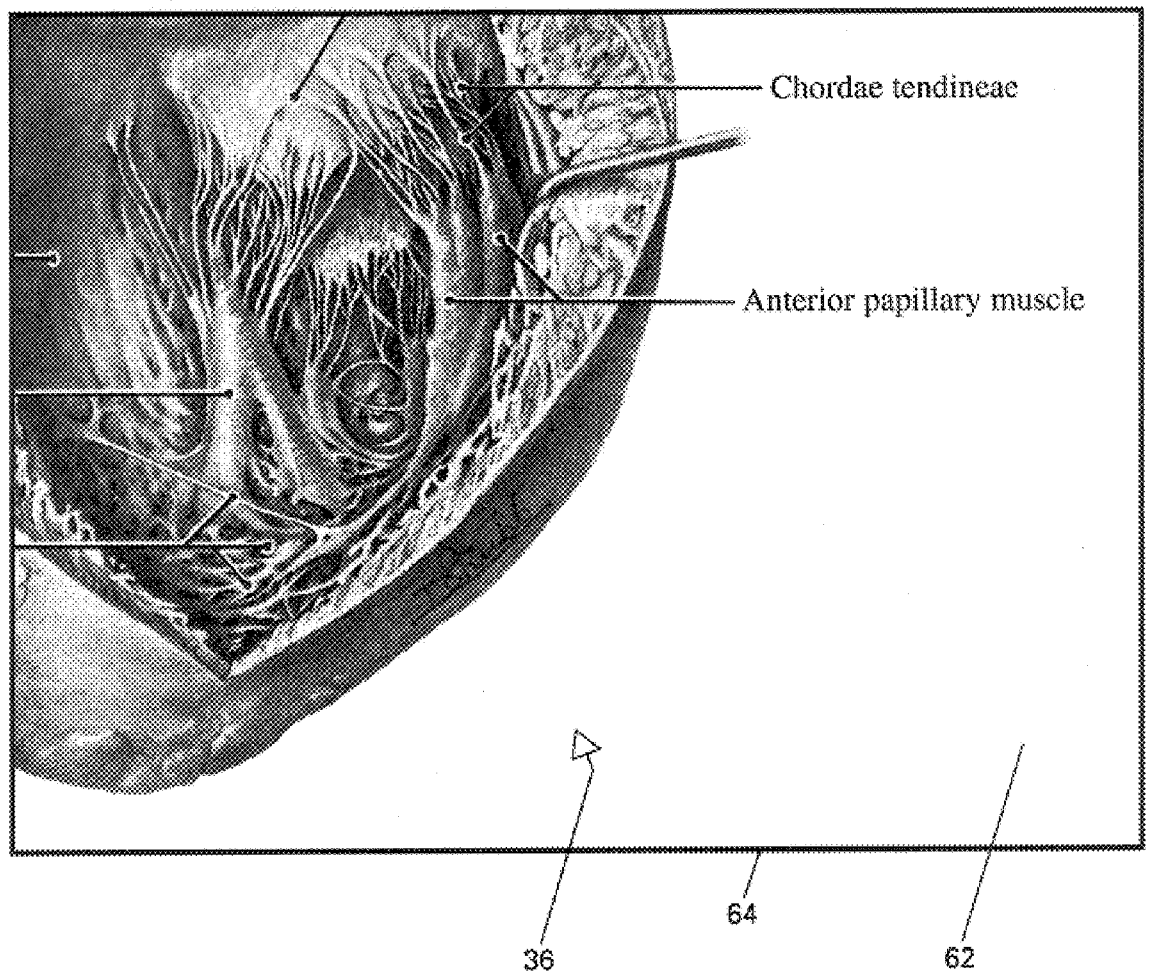
FIG. 6 is a screen display depicting the same graphic image as depicted in FIG. 5 but without the image of any scrollbar since the cursor, as shown therein, is not positioned over the displaying "hot spot."

The presently preferred embodiment of the instant invention employs a pointing device 36 as directed by the user, to deactivate the scrollbar event 58. This is done, again, most preferably, by allowing the user to position pointer 36 such that its positional coordinates correspond to a set of screen coordinates other than those paired with the screen coordinates of the main event table 54 or the scrollbar's activation table 55, as shown in FIG. 6. It should be appreciated, however, by those skilled in the art that the scrollbar event 58 can be deactivated by a variety of well-known means other than the utilization of "hotspots", such as menus, buttons, key sequences, key presses, switches 30, 32, and/or 34 on pointer control device 28.

A user is able to change certain characteristics of the scrollbar displaying event and/or the scrollbar event before the launching of the scrollbar event takes place through the modifying event loop handler 51. Specifically, as pointer 36 enters a coordinate location stored in the main event loop handler's main event table 54 the main event loop handler's (50) scrollbar displaying event 57 is activated which in turn activates the modification event loop handler of the scrollbar event 51, a menu (not shown) is generated by CPU 14 and displayed. The menu items from which a user can choose include the ability to modify and/or change certain characteristics of scrollbar displaying event and/or the scrollbar event including the presence of a time delay before the launch of the scrollbar event and the duration of the time delay, activation or deactivation of an icon to indicate the launch of the scrollbar event, the type of icon used as an indicator of the launch, the type of displaying means ("hotspot", button, switch, icon or automated selection under CPU control), horizontal scrollbar, vertical scrollbar, diagonal scrollbar, dial, gauge, icon, etc.), panning means screen position, size, shape, color, relief (i.e. none, indented, outdented), and visibility status (i.e., visible or invisible) as well as other characteristics of scrollbar events known in the art. Moreover, as will be further appreciated by one skilled in the art, the user can change the properties associated with the instant invention by means well-known in the art such as menu options, dialogue boxes, command line data entry, input field, pick boxes, scroll boxes, or any other means available for entering data. Once the user has selected the desired characteristics of the scrollbar displaying event and/or the scrollbar event the user saves these selected characteristics to scrollbar's displaying event properties table 53 and/or scrollbar event properties table 56 respectively and continues from the point at which he made the modifications. It will be readily appreciated by one of ordinary skill that a user may be able to similarly change characteristics of the scrollbar event's (58) scrollbar displaying event 46 after the activating scrollbar event takes place through an incorporated modification event loop handler 47 in the activation event loop handler's (52) activation table 55. In turn, the specific properties of each display means can be similarly modified. For example, if the means selected for activating the display of the scrollbar event is a button, the user is provided with means to modify the size, shape, etc. of the button. If the means selected is a menu, the name, location, etc. can be modified. Alternatively, if the means selected is a key press or sequence, then the identity of the key(s) can be modified. Moreover, as will be further appreciated by one skilled in the art, as event loop handlers are incorporated in each event, specifically the instant invention, they in turn can provide a means for activating any desired function.

It will be understood that the figures set forth and described herein are for illustration only and should not be taken as limitations upon the invention. It is contemplated that many changes and modifications may be made, by one of ordinary skill in the art, to the materials and arrangements of the elements of the invention without departing from the sphere and scope of the invention as disclosed above.

We claim:

1. In a computer controlled display system comprising a display device responsive to a central processing unit (CPU) for displaying data, a method of maximizing display real estate on a display screen of said display device comprising the steps of:

said CPU retrieving and displaying said data on said display screen;

a user moving a pointer over at least a portion of said data on said display screen using a pointer control device coupled to said CPU;

said CPU monitoring a coordinate position of said pointer as said user moves said pointer over said data on said display screen;

said CPU determining whether the coordinate position of said pointer on said display corresponds to a predetermined area on said display screen and, if so, automatically activating a previously hidden display event on said display screen without any event selection by said user, whereby said user may use said pointer to interact with said display event, once activated, so long as said CPU determines that said pointer remains located over said predetermined area on said display screen; and automatically deactivating said display event when said pointer is removed from said predetermined area on said display screen without any event selection by said user.

2. A method as in claim 1, wherein said predetermined area is a display "hot spot" on said display screen.

3. A method as in claim 1, wherein said predetermined area is a display icon on said display screen.

4. A method as in claim 1, wherein said previously hidden display event is a scrollbar display event which displays a scrollbar event which scrolls said data on said display screen in response to user selection using said pointer control device.

5. A method as in claim 4, comprising the further steps of:

said user positioning said pointer over a functional portion of said scrollbar event indicating a direction of scrolling of said data desired by said user; and said user selecting said direction of scrolling of said data by said scrollbar event by depressing a select button on said pointer control device when said pointer is positioned over said functional portion of said scrollbar event.

6. A method as in claim 4, comprising the further step of modifying properties of at least one of said scrollbar displaying event and said scrollbar event.

7. A method as in claim 6, wherein the properties of said scrollbar displaying event include at least one of: the presence of a time delay before the activation of said scrollbar event, a duration of said time delay, activation or deactivation of a display icon to indicate the launch of said scrollbar event, a type of icon used as an indicator of the launch of said scrollbar event, and a manner in which said scrollbar event is activated by the user.

8. A method as in claim 6, wherein the properties of said scrollbar event include at least one of: type of scrollbar, screen position of said scrollbar, size, shape, and color of said scrollbar, and whether said scrollbar is visible or invisible.

9. A computer controlled display system comprising:

a display device having a display screen;

a pointer control device which permits a user to move a pointer over at least a portion of said data on said display screen; and a central processing unit (CPU) which processes display software which retrieves and displays data on said display screen, monitoring software which monitors a coordinate position of said pointer on said display screen as said user moves said pointer over said data on said display screen, and event handler software including a main event table including a display event which is paired with a predetermined area on said display screen, said event handler software determining whether the coordinate position of said pointer on said display determined by said monitoring software corresponds to said predetermined area on said display screen and, if so, automatically activating said display event paired with said predetermined area without any event selection by said user, whereby said user may use said pointer to interact with said display event, once activated, so long as said event handler software determines that said pointer remains located over said predetermined area on said display screen, said event handler software further automatically deactivating said display event when said pointer is removed from said predetermined area on said display screen without any event selection by said user.

10. A system as in claim 9, wherein said predetermined area is a display "hot spot" on said display screen.

11. A system as in claim 9, wherein said predetermined area is a display icon on said display screen.

12. A system as in claim 9, wherein said display event is a scrollbar display event which displays a scrollbar event which permits the user to scroll said data on said display screen in response to user selection using said pointer control device.

13. A system as in claim 12, wherein said scrollbar event includes a scrollbar activation event handler including a scrollbar activation event table which, in turn, includes a further scrollbar display event which is paired with a scrolling device indicating a direction of scrolling of said data desired by said user, said scrolling device scrolling through said data in response to user depression of a select button on said pointer control device when said pointer is positioned over a functional portion of said scrolling device.

14. A system as in claim 13, wherein said scrolling device comprises a vertical scrollbar.

15. A system as in claim 13, wherein said scrolling device comprises a horizontal scrollbar.

16. A system as in claim 13, wherein said scrolling device comprises a diagonal scrollbar.

17. A system as in claim 13, wherein said scrolling device comprises a dial.

18. A system as in claim 13, wherein said scrolling device comprises a gauge.

19. A system as in claim 13, wherein said scrolling device comprises an icon.

20. A system as in claim 13, wherein said scrollbar activation event handler further includes a modifying event handler which modifies properties of at least one of said scrollbar displaying event and said scrollbar event.

21. A system as in claim 20, wherein the properties of said scrollbar displaying event include at least one of: the presence of a time delay before the activation of said scrollbar event, a duration of said time delay, activation or deactivation of a display icon to indicate the launch of said scrollbar event, a type of icon used as an indicator of the launch of said scrollbar event, and a manner in which said scrollbar event is activated by the user.

22. A system as in claim 20, wherein the properties of said scrollbar event include at least one of: type of scrollbar, screen position of said scrollbar, size, shape, and color of said scrollbar, and whether said scrollbar is visible or invisible.

* * * * *